United States Patent [19]

Jordan

[11] Patent Number: 5,616,286
[45] Date of Patent: Apr. 1, 1997

[54] PROCESS FOR THE MANUFACTURE OF ORGANOPHILIC CLAY

[75] Inventor: Frank W. Jordan, Clarkston, Mich.

[73] Assignee: T.O.W. Inc., Clarkston, Mich.

[21] Appl. No.: 527,024

[22] Filed: Sep. 12, 1995

[51] Int. Cl.$^6$ ............................. B01J 13/00; C04B 14/10; C04B 33/04
[52] U.S. Cl. .................. 252/315.2; 106/487; 252/314; 501/148; 524/445
[58] Field of Search .................. 252/315.2, 314; 106/487; 501/148; 524/444, 445

[56] References Cited

U.S. PATENT DOCUMENTS

| | | | |
|---|---|---|---|
| 2,531,427 | 11/1950 | Hauser | 556/9 |
| 2,531,440 | 11/1950 | Jordan | 252/28 |
| 4,382,868 | 5/1983 | House | 252/315.2 X |
| 4,569,923 | 2/1986 | Knudson, Jr. et al. | 501/148 |
| 4,623,398 | 11/1986 | Goodman et al. | 501/148 X |
| 4,664,820 | 5/1987 | Magauran et al. | 252/315.2 X |
| 4,664,842 | 5/1987 | Knudson, Jr. et al. | 252/315.2 |
| 4,743,305 | 5/1988 | Doidge et al. | 501/148 X |
| 5,028,351 | 7/1991 | Kato et al. | 252/315.2 |
| 5,110,501 | 5/1992 | Knudson, Jr. et al. | 252/315.2 |
| 5,334,241 | 8/1994 | Jordan | 106/487 |

*Primary Examiner*—Richard D. Lovering
*Attorney, Agent, or Firm*—Gifford, Krass, Groh, Sprinkle, Patmore, Anderson & Citkowski, P.C.

[57] ABSTRACT

Organically modified clays are advantageously prepared in a direct addition, low moisture process by mixing clay, a cationic, organic material, and an optional dispersant under high pressure conditions such that the cationic organic compound substitutes for inorganic cations in the clay. Processing is preferably carried out in several separate stages under pressure conditions of at least 3,000 psi, and it is preferred that at least one of the processing stages takes place at a pressure of at least 8,000 psi.

15 Claims, 3 Drawing Sheets

PROCESS FOR THE MANUFACTURE OF ORGANOPHILIC CLAY

FIELD OF THE INVENTION

This invention relates generally to clays and more specifically to organically modified clays of the type used as thickeners and gelling agents. Most specifically, the invention relates to an improved, low moisture, direct addition process for the manufacture of high performance organically modified clays.

BACKGROUND OF THE INVENTION

Certain colloidal clays will swell in water to many times their dry volume, and as such are of utility as gelling or thickening agents for control of the rheological properties of a variety of materials. These naturally occurring clays are generally not compatible with a number of organic-based compositions. Hence, it is necessary to organically modify these clays to make them compatible with organic materials, and such clays are generally referred to as "organophilic" clays or "organo-clays". These clays have a large number of uses for thickening organic compositions such as paints, lubricants, cable filling compositions and the like.

The basic starting material used to make organophilic clay is an exchangeable clay of the smectite group and can include montmorillonite (commonly known and mined as bentonite), hectorite, saponite, attapulgite and sepolite. These clays include exchangeable cationic species such as sodium, potassium or calcium ions on their surface. In the course of manufacturing an organophilic clay, at least a portion of these exchangeable cationic species are substituted by an organic cation such as a quaternary amine, an organophosphorus ion, any other ion of the type known in the art as an oniumion, or the like. The addition of the organic group modifies the clay, making it compatible with organic compositions and in general allowing it to provide rheological modification in select organic fluids.

There is a large body of prior art relating to the manufacture of organophilic clays. For example, U.S. Pat. Nos. 2,531,427 and 2,531,440 both disclose general processes for the manufacture of organically substituted clays. U.S. Pat. No. 5,110,501 discloses a process for preparing organophilic clay in which the starting materials are reacted in a slurry under high shear. U.S. Pat. No. 5,334,241, discloses a low moisture, direct addition process for the fabrication of organophilic clays. U.S. Pat. No. 4,569,923 discloses yet another process for manufacturing organo-clays in which the clay is subjected to high energy pugmilling before reaction with the cation. In addition to processing parameters, the properties of an organo-clay will depend upon the nature of the organic cation used for modification, as well as upon the amount of the cation incorporated into the clay. Specific modifiers are utilized for particular mixtures.

It has been found that the amount of organic cationic material which is incorporated into the clay will depend upon the particular technique used for its incorporation. The clays of interest have a generally lamellar structure, and the structure must be opened to some degree in order to permit the cation exchange reaction to take place. At the same time, care must be taken to avoid destroying the lamellar microstructure of the clay. One group of substitution techniques involves processing the clay in a slurry form, in which instance, solvation relaxes the clay's structure in order to permit penetration of the organic cations. While such techniques are effective, and widely employed, it is desirable to avoid such highly dilute reaction conditions since forming the slurry involves a time and space consuming step. Furthermore, dewatering of the finished product is energy-intensive. For this reason, low moisture, direct addition techniques as described in U.S. Pat. N. 5,334,241, the disclosure of which is incorporated herein by reference, are advantageously employed in the preparation of modified clays.

The present invention recognizes that in a direct addition process such as that disclosed in U.S. Pat. No. 5,334,241, it is desirable to achieve a high degree of substitution in the clay, while minimizing damage to its microstructure. The invention further recognizes that conventionally employed measures of the energy input utilized in the manufacture of an organo-clay, as for example in terms of horsepower hours per ton, are not good indicators of success in the fabrication of a high performance organo clay in a direct addition process. The present invention recognizes that high pressure conditions are needed in order to achieve a high degree of substitution with minimal degradation of the clay structure. It has been found that clay processed under high pressure conditions is superior to an equivalent clay processed under lower pressure conditions, even though the overall energy input thereto is the same, and it is postulated that this is because a low pressure reaction, is not adequate to provide a high degree of clay substitution; furthermore, it has been found that if the low pressure reaction is carried out for a sufficiently long period of time it only serves to degrade the clay structure. Therefore, the present invention recognizes that clays produced under high pressure conditions are superior to those produced under lower pressure conditions, even though the total energy input in the low pressure reaction is the same or greater. It has further been found that multi-stage processing of clay material, wherein reactants are subjected to at least two cycles of high pressure mixing provides an improved product as compared to single stage processing of materials. These and other advantages of the present invention will be readily apparent from the drawings, discussion and description which follow.

BRIEF DESCRIPTION OF THE INVENTION

There is disclosed herein a method for manufacture of organically substituted clays. The method includes the step of subjecting a mixture of a non-slurried volume of clay having an exchangeable cationic species, and a cationic organic material to a first stage reaction in which the materials are mixed under a confining pressure of at least 3,000 psi. This first stage processing produces a mixture of clay and residual cationic material in which some of the exchangeable cationic species in the clay are substituted by some of the cationic organic material. This first stage mixture is then subjected to a second stage process in which the materials are mixed under a confining pressure of at least 8,000 psi to further promote the exchange reaction. The resultant product from the second stage of processing may then be subjected to further processing stages generally similar to the first or second. The resultant product may then be subjected to final proccessing, as for example by drying and grinding.

In further embodiments of the invention, the clay and organic cationic material may be premixed prior to the first stage of processing. The mixture may also include a dispersant, and this dispersant may be added in the premix stage, or during the processing stages. The processing stages may be carried out in a single apparatus wherein the reactants travel directly from a first stage to a second. In other instances, processing may be carried out in a single unit by recycling material back through an apparatus. In other instances, two separate units arranged in series may be employed to carry out the separate processing steps. The mixture may be conveyed between processing stages at elevated pressure, or it may be returned to ambient atmospheric pressure between stages. In one particular embodiment, the first stage of processing is carried out at 3,000–8,000 psi and the second stage at greater than 8,000 psi. In other embodiments, the first and second stage of processing are carried out at the same pressures, which are in excess of 8000 psi.

DETAILED DESCRIPTION OF THE INVENTION

In accord with the present invention, there is provided an improved method for the manufacture of organically substituted clay. The method involves subjecting a reaction mixture of clay and organic, cationic species to at least a first and a second stage reaction process. The stages of the process may be carried out at the same pressure, or at different pressures, but in general, the reactions should take place at a pressure of at least 3,000 psi, and preferably, one of the stages will subject the reactants to a pressure of at least 8,000 psi. Although the process of the present invention will be described with particular reference to specific classes of clays and specific organic, cationic materials, it is to be understood that the present invention may be employed in connection with the manufacture of a variety of organically modified clays; and accordingly, a corresponding variety of reactants will be available and apparent to one of skill in the art. The present invention is most preferably carried out in connection with a direct addition reaction process of the type disclosed in U.S. Pat. No. 5,334,241 and in U.S. patent application Ser. No. 08/491,635, filed Jun. 19, 1995, the disclosure of which is incorporated herein by reference.

Figure 1:
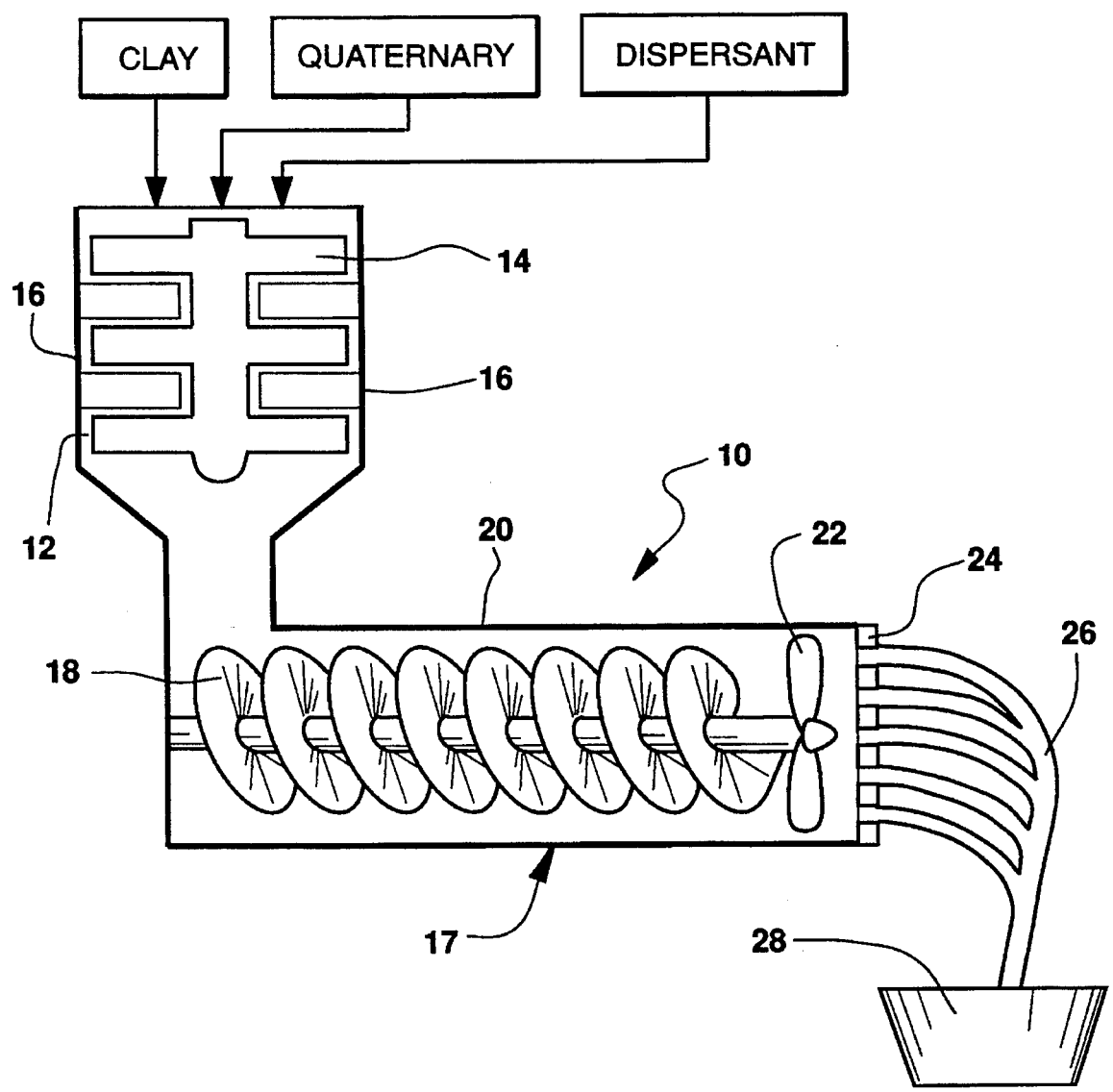
FIG. 1 is schematic depiction of one particular apparatus which may be employed in the practice of the present invention.

Referring now to FIG. 1, there is shown a schematic depiction of one system for carrying out a direct addition, low moisture process for the fabrication of organo-clays. The system 10 of FIG. 1 is operable to confine the clay and an organic cationic material, typically a quaternary compound, under very high pressure conditions while permitting thorough mixing of the material. In the illustrated embodiment, the apparatus 10 incudes a premixing station 12 wherein clay, quaternary and an optional dispersant material are blended together to form a fairly homogenous mixture. The premixer 12 may comprise a ribbon blender or a Z-type batch mixer, or in the illustrated embodiment, a continuous mixer such as a pug mixer, wherein the materials are blended by the combined action of a rotor 14 cooperating with stationary fingers 16. The mixture of clay, quaternary and dispersant passes from the premixer 12 to the high pressure reaction portion of the apparatus 17. The high pressure portion 17 is somewhat similar to an extrusion apparatus insofar as it includes an extrusion auger 18 operating within a vessel shell 20. The auger 18 receives the mixed clay, quaternary and dispersant from the premixer 12. Rotation of the auger 18 mixes and propels the clay mixture through the vessel 20 and at the same time creates a very high confining pressure therein. At the downstream end of the vessel 20, a mixing blade assembly 22 is disposed so as to thoroughly stir the highly compressed clay-quaternary dispersant mixture it will be noted that the downstream end of the apparatus 10 is closed by a perforated extrusion plate 24. The plate 24 includes a plurality of openings therein and serves to permit exit of the mixed material therefrom. By proper choice of auger, vessel 20 and extrusion plate 24, the confining pressure, degree of mixing and extrusion rate of finished product is controllable.

In carrying out the mixing it has been found that significant temperature rises occur, and it is important to avoid overheating. Some heating is desirable; however, excess heat could decompose the resultant product. It has generally been found that the high pressure, high mixing conditions do cause significant temperature elevations and it is frequently necessary to provide water cooling to the mixing vessel, as for example by use of an exterior water line or jackets, or to carefully monitor the mixing speed and pressures. It is generally desirable to maintain the temperatures near, but not exceeding 180° F.

In accord with the present invention, it has been found that the performance of the resultant organo clay is improved, if the clay is subjected to several stages of processing, and if pressure conditions in at least one of the stages exceed 8,000 psi. Multi-stage processing may be carried out with an apparatus generally similar to that of FIG. 1 by simply returning the collected material 26 back to the inlet of the processing apparatus 10, either through the premixer 12, or by bypassing the premixer 12 and introducing the material 26 directly to the feed hopper of the apparatus. If both stages of processing are carried out in the single apparatus of FIG. 1, it is desirable that at least the second stage of processing take place at pressures of at least, and preferably above 8,000 psi. As noted above, pressure within the apparatus may be regulated by control of the size of holes in the extrusion plate, as well as by control of feed rate, pitch of the auger 18, and rotational speed of the auger 18.

Figure 2:
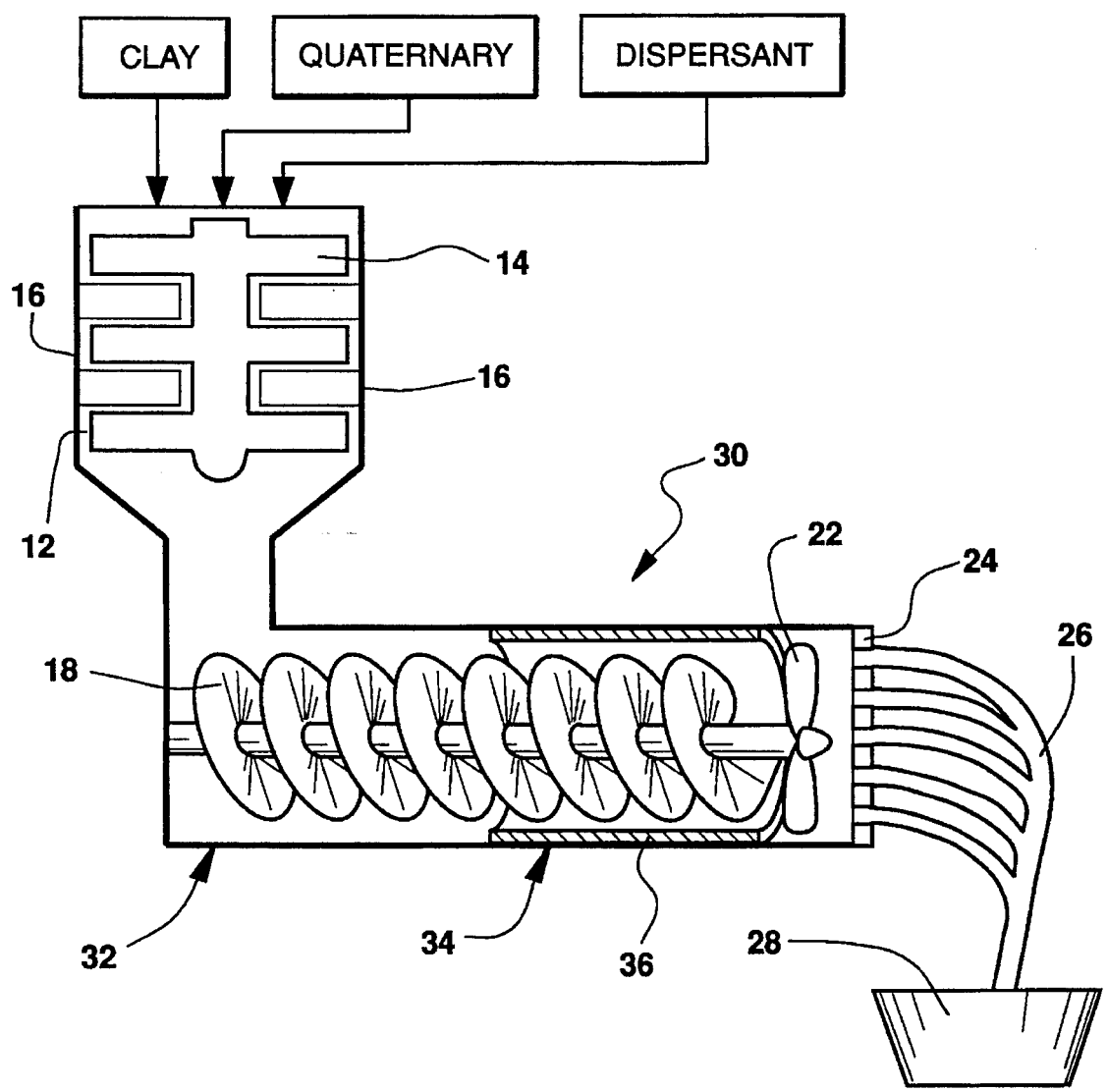
FIG. 2 is a schematic depiction of another apparatus which may be used in the practice of the present invention which provides for first and second stage reactions within a single apparatus.

It is possible to implement both stages of processing in a single apparatus, without the need to recycle collected material as previously described. Referring now to FIG. 2, there is shown another apparatus which may be utilized in the practice of the present invention. The apparatus 30 of FIG. 2 is generally similar to the apparatus 10 of FIG. 1, and in this regard includes the premixer 12 and auger 18 as previously described. In the apparatus of FIG. 2, there are included two separate high pressure mixing stations 32, 34, and the auger 18 passes through both. The first station 32 is of relatively wide diameter, and is generally comparable to the station 17 depicted in FIG. 1. This station will produce a first pressure in the reactants passing therethrough. The second station 34 includes an internal sleeve 36 which restricts the diameter of the station 34, and thereby further increases the pressure therein. In this manner, the first stage reaction mixture which was prepared in the first station 32 is subjected to increased pressure in the second station 34. Thus two stages of processing can be achieved in a single apparatus, and under different pressure conditions.

Other variations of the apparatus may be similarly employed to produce different pressure conditions. For example, the pitch of the auger may be changed in one section, as compared to the other so as to provide pressure variations. Alternatively, a counter-rotating auger, or a series of stators may similarly be included in a portion of the apparatus to provide a second station having higher pressure conditions. In yet another embodiment, an internal baffle, or plate similar to the plate 24 may be provided within the apparatus to boost pressure. In some instances, an additional mixing blade 22 may be provided between the two mixing stations 32, 34, to further enhance mixing of the reactants therein.

In the apparatus of FIG. 2, the process is illustrated as being carried out with the second stage reaction at a higher pressure than the first. Within the context of the present invention, and within the pressure limitations set forth herein, it is possible to carry out the reaction under conditions such that the second stage is at the same, or lower, pressure than the first stage.

Figure 3:
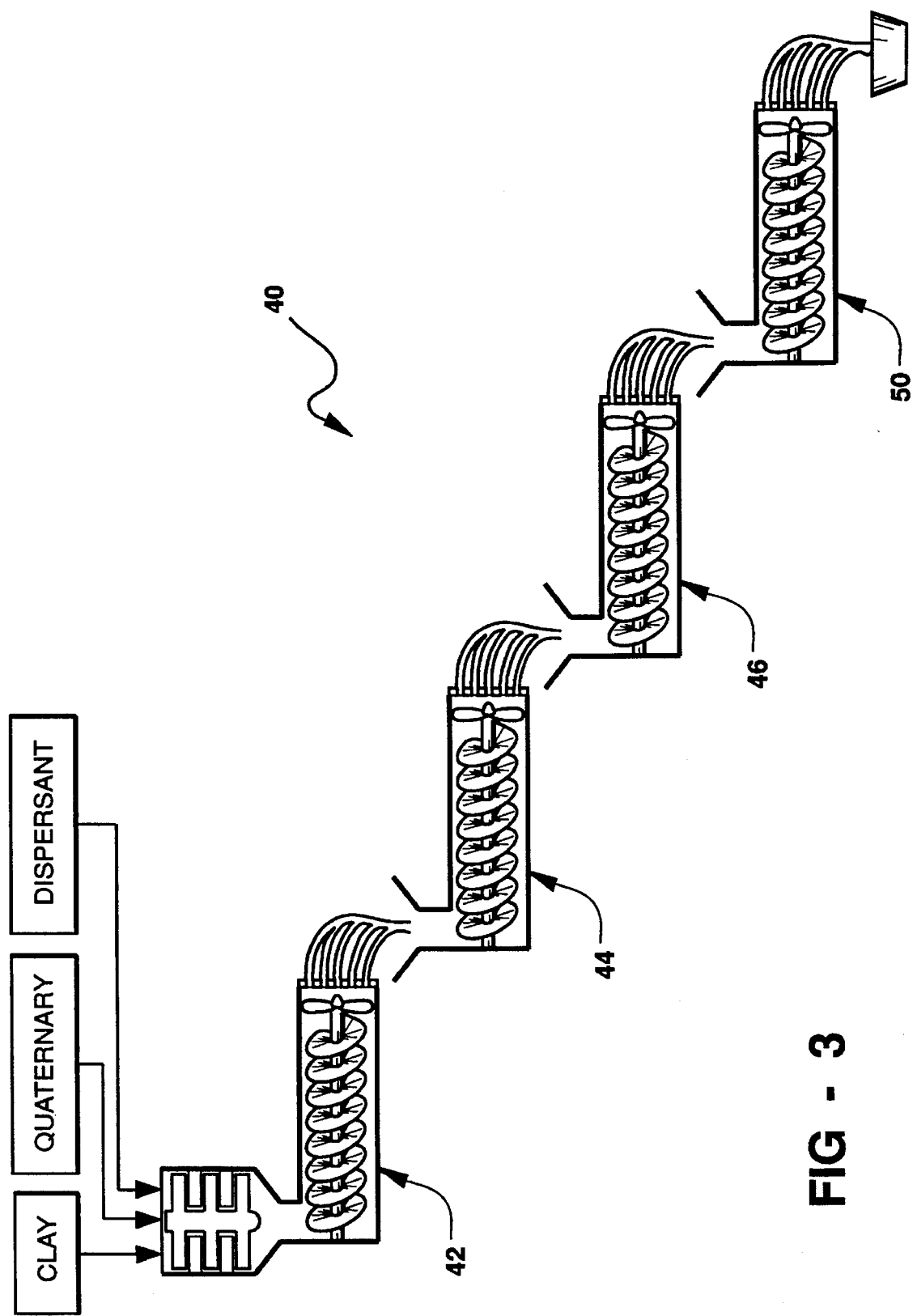
FIG. 3 is a schematic depiction of another apparatus which may be employed in the practice of the present invention.

Yet other embodiments of apparatus may be utilized to carry out the method of the present invention. Referring now to FIG. 3, there is shown a multi-stage processing apparatus 40 which is configured out to implement four separate stages of reaction. The apparatus 40 of FIG. 3 includes the first station 42, a second station 44, a third station 46, and a fourth station 50. Each station is generally similar to the apparatus 10 illustrated in FIG. 1, except that the premixer 12 is only included in the first station 42, and subsequent stations 44, 66 and 50 are each disposed so as to receive the output of a preceding station. Pressure conditions in each of the stations 42, 44, 46 and 50 may be separately controlled, as described hereinabove, by control of factors such as plate size, auger pitch, auger speed and the like. It is to be understood that other modifications and variations of the apparatus depicted herein may be implemented. For example, the apparatus 30 of FIG. 2 may be configured to include still further reaction stations. Likewise, the system 40 of FIG. 4 may include a larger or smaller number of reaction stations.

Yet other apparatus may be adapted to the practice of the present invention. For example, several stages of high intensity mixing may be carried out in a single or twin screw extruder device, of one of the types utilized in the plastics industry. One particularly suitable device is manufactured by the Teledyne-Readco Corporation and includes two shafts which retain a number of very heavy rotor elements. By selection of particular rotor elements, the shafts can be specifically configured to particular applications. As the shafts turn, each element on one shaft turns against a similar element on an adjacent shaft, moving material forward through the machine against a back pressure provided by succeeding elements. This action provides mixing under very high confining pressure, and by the particular configuration of the elements a series of separate stages may be implemented.

While applicant does not wish to be bound by speculation, it appears that the process of the present invention functions through the action of a mixer operating under pressure and causing individual clay platelets to slide against each other exposing new surfaces to the organic cation for reaction. This process presents new surfaces for reaction through shear mixing under pressure, and must be continued long enough or repeated often enough to bring about reaction between the cationic material and clay. Simple mixing or a simple extrusion typically fails to provide sufficient high shear mixing and high enough pressure to bring about this reaction. While various machines of the prior art may transfer large amounts of work energy into the reaction mixture, the net result will not be adequate to produce the required reaction in the absence of the high pressure, high shear mixing, and may serve to degrade clay structure.

EXPERIMENTAL

Organo clays, of the type described herein are widely used as thickening agents for paints as well as in many other applications; and in order to illustrate the advantages of the present invention, a series of organo clays were prepared, and tested in the context of paint formulations.

PREPARATION OF THE PAINT

In each experimental series, a paint was prepared utilizing the following ingredients:
(1) Cargill alkyd resin #7150, medium oil, mixed soya-linseed;
(2) Enamel grade $TiO_2$, supplied from the DuPont Corporation;
(3) Intersperse pigment Wetting Agent, a surfactant supplied by the Noury division of the Akzo Chemical Corporation;
(4) Mineral spirits solvent; and
(5) The test clay.

In order to prepare the paint, 40 g. of the resin, 50 g. of the pigment and 0.3 g. of the wetting agent were weighed into a 120 ml container and thoroughly mixed utilizing a Hamilton Beach blender having a 0.875 inch diameter fluted rotor. 2.2 g. of the clay was then added into the container, while mixing was maintained, and the blend ground at full mixer power of about 18,000 rpm for four minutes. This typically produced a temperature rise to about 120°–140° F. The paint composition was then removed from the mixer and further solvent, typically in the amount of 21.9 g. was added for let down. Mixing was carried on for 10 minutes at relatively low speed. The thus prepared paints were allowed to stand overnight in a temperature controlled room maintained at 70° F.±0.5° F., and Brookfield viscosities were measured at 5 and 50 rpm on an RVTD digital viscometer. Thixotropic index was calculated by dividing the five rpm reading, multiplied by 10, by the 50 rpm reading.

EXPERIMENTAL SERIES 1

A series of organo clays were produced from a premix of 100 lbs of bentonite clay, 53.5 lbs of a di-alkyl, dimethyl ammonium chloride quaternary compound. The quaternary compound was 75% active with the remainder comprising volatile solvents, primarily water and isopropyl alcohol, and the alkyl portion thereof comprised a C14-C18 hydrocarbon. The composition further included 7 lbs of a dispersant agent comprising hydrogenated castor oil and 15 lbs of water to facilitate the reaction. This formula was split into four portions and processed in an apparatus generally similar to that of FIG. 1. Processing conditions were as follows:
1. The first sample was passed once through the apparatus, which included a back-up plate having ⅛ inch diameter holes.
2. The second sample was passed twice through the same machine with the same back-up plate.
3. The third sample was passed three times through the same plate and the same machine.
4. The fourth portion was passed four times through the same plate and the same machine.

Paint formulations were prepared from each of the four samples as described above, and the materials were evaluated for viscosities at 5 rpm, 50 rpm, and the thixotropic index was calculated therefrom. The data is summarized in Table 1 hereinbelow.

| Sample | 5 RPM | 50 RPM | THIX INDEX |
| --- | --- | --- | --- |
| 1. | 3.0 | 13.1 | 2.29 |
| 2. | 3.6 | 13.8 | 2.61 |
| 3. | 4.6 | 17.3 | 2.66 |
| 4. | 4.0 | 15.5 | 2.58 |

SECOND EXPERIMENTAL SERIES

A second batch of organo clay premix was prepared as in the previous example from 100 lbs of bentonite clay, 47 lbs of the same quaternary material, 7 lbs of the same dispersant and 12 lbs of water. The mixture was processed in an apparatus generally similar to that of FIG. 1 as set forth below:

5. This sample was passed once through an apparatus similar to that of FIG. 1 having a back-up plate with 3/16 diameter holes.
6. This material was passed twice through the same machine, with the same plate.
7. This material was passed three times through the same machine having the same plate.
8. This material was passed once through the same machine, but with a back-up plate having 1/8 inch diameter holes.

Paint formulations were prepared as listed as above, and the results are set forth hereinbelow in Table 2.

| SAMPLE | 5 RPM | 50 RPM | THIX INDEX |
| --- | --- | --- | --- |
| 5. | 1.6 | 7.5 | 2.13 |
| 6. | 2.2 | 9.1 | 2.42 |
| 7. | 2.4 | 10.7 | 2.24 |
| 8. | 2.5 | 10.7 | 2.34 |

THIRD EXPERIMENTAL SERIES

A premix of clay, quaternary, dispersant and water was prepared as in the first experimental series, and the mixture processed in an apparatus generally similar to that of FIG. 1 under the following conditions:

9. This sample was passed three times through an apparatus having a back-up plate with 3/8 inch diameter holes.
10. This material passed three times through an apparatus having a back-up plate with 1/4 inch diameter holes.

Paint samples were prepared and tested as set forth above, and the results are summarized in Table herein below.

| SAMPLE | 5 RPM | 50 RPM | THIX INDEX |
| --- | --- | --- | --- |
| 9. | 2.2 | 8.1 | 2.72 |
| 10. | 3.0 | 10.0 | 3.00 |

The results obtained from these experimental series are internally comparable; that is to say, various members of a series may be directly compared. However, results between experimental series are not comparable on an absolute basis, since the base mixtures of reactants in the series varied in composition. Nevertheless, conclusions can be made from the foregoing. It has been noted that performance of the resultant organo clay improves as the size of the holes in the back-up plates is decreased. This is consistent with the teaching of the present invention regarding the necessity for utilizing high pressure conditions. In fact, it is estimated that the best materials compared in the foregoing series are all prepared at pressures in excess of 8,000 psi. It has also been noted that repeated processing, even through the same apparatus gives progressively improved performance, up to a point at which performance degrades. This again is consistent with the holding of the present invention that excessive processing is to be avoided, since degradation of clay structure takes place. Therefore, it is concluded that processing must take place at a sufficiently high pressure so as to bring about a high degree of reaction of the clay. Furthermore, excessive processing times are to be avoided. Processing under low pressure conditions is undesirable, since it will not produce a high degree of reaction, even if carried on for a very lengthy period of time; and in fact, such extended processing will actually degrade the performance of the clay. Therefore, it has been found, in accord with the present invention, that optimum production of organo clay materials is achieved in a non-slurried, low moisture, direct addition process, when processing is carried out in multiple stages, and wherein at least some of the processing stages take place at pressures in excess of 8,000 psi.

It is to be understood that the present invention may be implemented in accord with a number of various apparatus, as detailed hereinabove. The foregoing drawings, discussion, description and examples are meant to illustrate particular embodiments of the present invention, but are not meant to be limitations upon the practice thereof. It is the following claims, including all equivalents, which define the scope of the invention.

I claim:

1. A method for manufacturing an organically substituted clay comprising the steps of:

providing a substantially non-slurried volume of a clay having an exchangeable cationic species;

providing a volume of a cationic organic material;

subjecting said non-slurried clay and said cationic material to a first stage reaction process wherein said clay and said cationic material are subjected to a confining pressure of at least 3,000 psi while being mixed so that at least some of the exchangeable cationic species in the clay are substituted by said cationic material so as to provide a non-slurried first stage reaction mixture, which comprises an organically substituted clay which has some residual, exchangeable cationic species therein and some residual cationic material in a free form; and subjecting said non-slurried first stage reaction mixture to a second stage reaction process wherein said mixture is subjected to a confining pressure of at least 8,000 psi while being mixed so that at least some of the residual, exchangeable cationic species in the clay are substituted by said residual, cationic material.

2. A method as in claim 1 including the further step of premixing said clay and said cationic organic species so as to produce a pre-mix, and then subjecting said pre-mix to said first stage reaction.

3. A method as in claim 2, including the further step of adding a dispersant material to said clay and said cationic material during the premixing step.

4. A method as in claim 3, wherein the step of adding a dispersant material comprises adding a dispersant material selected from the group consisting of: neopentyl glycol, pentaerythritol, hydrogenated castor oil, sulfonated castor oil, toluene sulfonamide, tri-alkoxy-phosphate, and combinations thereof.

5. A method as in claim 1, wherein said clay is selected from the group consisting of: montmorillonite, hectorite, saponite, attapulgite, sepiolite, and combinations thereof.

6. A method as in claim 1, wherein said first stage reaction process and said second stage reaction process are carried out within a single apparatus.

7. A method as in claim 1, wherein said first stage reaction process and said second stage reaction process are carried out in separate apparatus.

8. A method as in claim 1, wherein said first stage reaction mixture is returned to ambient atmospheric pressure prior to said second stage reaction process.

9. A method as in claim 1, wherein said first stage reaction process carried out at a confining pressure in the range of 3,000 psi to 8,000 psi.

10. A method as in claim 1, wherein said second stage reaction process is carried out at a confining pressure in excess of 8,000 psi.

11. A method as in claim 1, wherein said first stage reaction process and said second stage reaction process are carried out at the same pressure.

12. A method as in claim 1, wherein the cationic organic material is of the general formula $(MR_4)^+X^-$, wherein M is nitrogen or phosphorous, R is alkyl, or alkyl-aryl, and X is halogen or methylsulfate.

13. A method as in claim 1, wherein said cationic material comprises a mixture of organic cationic materials comprising $X_2R_{22}N^+$, and $XYR_2N^+$, wherein X is methyl, Y is benzyl and R is a saturated alkyl.

14. A method as in claim 1, including a final step of grinding the organically modified clay produced by said process to a particle size such that said clay passes through a 325 mesh screen.

15. A method as in claim 1, including the further step of subjecting the product from said second stage reaction process to at least a third stage reaction process which said product is subjected to a confining pressure of at least 3,000 psi while being mixed.

* * * * *